United States Patent [19]
Waniishi et al.

[11] B 3,924,838
[45] Dec. 9, 1975

[54] COOKING UTENSIL

[75] Inventors: Kenji Waniishi; Koichiro Ninomiya, both of Hitachi, Japan

[73] Assignee: Hitachi, Ltd., Japan

[22] Filed: Sept. 19, 1972

[21] Appl. No.: 290,328

[44] Published under the Trial Voluntary Protest Program on January 28, 1975 as document no. B 290,328.

[30] Foreign Application Priority Data
Sept. 22, 1971 Japan.............................. 46-73388

[52] U.S. Cl.................................. 259/108; 99/348
[51] Int. Cl.² ......................................... B01F 7/16
[58] Field of Search ...... 99/348, 357; 259/107, 108, 259/DIG. 18, DIG. 25, DIG. 26, DIG. 27; 241/DIG. 4, DIG. 13

[56] References Cited
UNITED STATES PATENTS

| | | | |
|---|---|---|---|
| 2,798,700 | 7/1957 | Corbett........................ | 259/DIG. 35 |
| 2,905,452 | 9/1959 | Appleton ............................. | 99/348 |
| 3,220,450 | 11/1965 | Aronson .............................. | 259/108 |
| 3,315,946 | 4/1967 | Nissman............................. | 259/108 |

Primary Examiner—Robert W. Jenkins
Attorney, Agent, or Firm—Craig & Antonelli

[57] ABSTRACT

In a cooking utensil of the type in which a cooking appliance attachment such as a juicer, mixer, coffee mill, meat blender or the like may be releasably mounted upon a main body in which is housed an electric motor in such a manner that the motor in the main body may be drivingly coupled to a rotary member in the attachment, clamping means for firmly holding the mounted attachment in position with respect to the main body are disposed on the top thereof and are actuated by a lever extending out of the main body and operatively connected to the clamping means with connecting means. When the lever is rotated in one direction, the pawls of the clamping means are advanced horizontally and radially inwardly toward an annular flange formed at the bottom of the attachment and firmly engage with the annular flange, thereby securely holding the attachment upon the main body. When the lever is returned to its initial positon the pawls are caused to retract to their initial positions so that the attachment is released.

10 Claims, 6 Drawing Figures

COOKING UTENSIL

BACKGROUND OF THE INVENTION

The present invention relates to a cooking utensil.

The cooking utensils may be generally divided into two types. In one type a cooking utensil generally comprises a main body including an electric motor and a variety of attachments one of which may be selectively mounted on the main body as needs demand. In the other type a cooking utensil comprises a main body including an electric motor and only one attachment. The cooking utensil of the present invention belongs to the former type.

In the conventional cooking utensils of the type described, a pair of clamps are generally used to firmly hold a cooking attachment such as a juicer, a mixer, a coffee mill or the like upon a main body. The clamps used in the conventional cooking utensils present the three major problems. The first problem is that the attachment and removal of a cooking attachment or applicance is very inconvenient and takes a long time. The second problem is that the handling and storage of the cooking utensil is inconvenient because the clamps extend outwardly from the utensil and constitute an obstacle. The third problem is that a wide variety of cooking attachments must have the same shape and dimensions so that the clamps may engage them so as to firmly hold them upon the main body. This means that their functional requirements must be sacrificed in order to compromise with the predetermined requirements in shape and dimension, thus resulting in the functional and economical disadvantages.

SUMMARY OF THE INVENTION

One of the objects of the present invention is therefore to provide an improved kitchen utensil which may overcome the above and other defects and problems encountered in the conventional kitchen utensils.

Another object of the present invention is to provide an improved kitchen utensil which may be easily handled by both right-handed and left-handed men.

Another object of the present invention is to provide an improved kitchen utensil compact in size and light in weight.

Briefly stated, according to the present invention clamping means for firmly holding an attachment upon a main body is provided within the main body and clamp actuating means which is operatively coupled to the clamping means is also disposed in the main body and is operatively coupled to an exterior actuating means.

Generally stated, a cooking utensil in accordance with the present invention generally comprises a main body including an electric motor; a plurality of cooking appliances removably mounted atop of said main body; coupling means (disposed on said main body) for coupling the rotary shaft of said motor to a rotary member of said cooking appliance when the latter is mounted upon said main body and for releasing said coupling when said cooking appliance is removed from said main body; positioning means (disposed in said main body) for placing said cooking appliance in correct position on said main body, said positioning means comprising receiving means on the side of said main body and means on the side of said cooking appliance adapted to be received by said receiving means; said receiving and received means being disposed in the proximity of said rotary shaft of the motor and of said rotary member respectively; clamping means disposed on said main body in the proximity of the joint between said main body and said cooking appliance; said clamping means being adapted to releasably clamp means disposed on the side of said cooking appliance in the proximity of said joint between said main body and said cooking appliance, thereby firmly holding said cooking appliance with respect to said main body; means for actuating from the exterior of said main body said clamping means to cause it to clamp or release said cooking appliance; and means for connecting said actuating means to said clamping means.

According to the present invention therefore the three major problems encountered in the prior art cooking utensils may be overcome as follows:

1. The clamping means may be actuated by the exterior actuating means by one hand while the other hand firmly holds a cooking appliance or attachment so that the attachment and removal may be much facilitated. More particularly one may hold the cooking appliance or attachment by one hand and place it upon the main body, and may clamp the attachment by operating the exterior actuating means by the other hand. Thus the attachment and removal may be made very rapidly in a very simple manner.

If the engagement between the rotary shaft of the motor and the rotary member of the attachment is not established satisfactorily when the attachment is mounted on the main body, the attachment must be removed from the main body and placed upon the main body in a correct manner. But this readjustment of the cooking appliance may be made in a simple manner. More particularly, one operates the actuating means to release the clamping means, displace the cooking appliance or attachment to the correct position by one hand, and operates again the actuating means so that the clamping means may firmly hold the attachment in position. The adjustment of the attachment with respect to the main body may be made in a very simple manner within a short time as compared with the prior art cooking utensils. Any desired attachment may be easily mounted upon the main body within a short time so that there is no fear at all that the food becomes inferior in freshness.

2. The actuating means and the clamping means are disposed in spaced apart relation. The actuating means must extend out of the main body because it must be operated by hand, but the clamping means may be disposed adjacent to the joint between the main body and the attachment mounted thereupon. The actuating means is of course made smaller in size than the clamps attached to the prior art cooking utensils because the actuating means needs not to serve as a handle. The actuating means will not constitute an obstacle opposed to the clamps of the prior art cooking utensils. The prior art cooking utensiles generally have a plurality of clamps, but the cooking utensil in accordance with the present invention has only one actuating means which extends out of the main body. Therefore the probability of the actuating means of hitting against other objects becomes very low so that the clamping means may be positively prevented from being erroneously released. Since the cooking utensil in accordance with the present invention has no obstacle, it is best adapted to be used in a small kitchen and it requires no large storage space.

3. The dimensions of the positioning means on the side of the various attachments are so determined that the attachment may be snugly fitted over the positioning means on the side of the main body, and the shape and dimensions of the clamped means on the side of the attachment are also so determined that the clamped means may be firmly clamped by the clamping means on the side of the main body. Therefore it becomes possible to design the attachments such as coffee mill, meat blender or the like only from the standpoint of their functions. Only the limitations imposed upon the attachments are the positions and dimensions of the positioning means and clamped means which are disposed on the bottom of the attachment. The attachments used in the prior art cooking utensils must have the same exterior dimensions regardless of their functions because they are placed in position by the clamps, but the attachments used in the cooking utensil in accordance with the present invention may have the optimum shape and dimensions so that the cost may be reduced and the efficiency may be enhanced.

DESCRIPTION OF THE PREFERRED EMBODIMENTS

Figure 1:
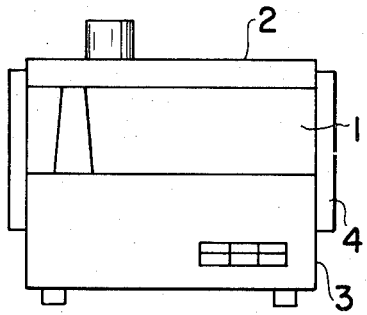
FIGS. 1 and 2 are views of prior art juicers.
Figure 2:
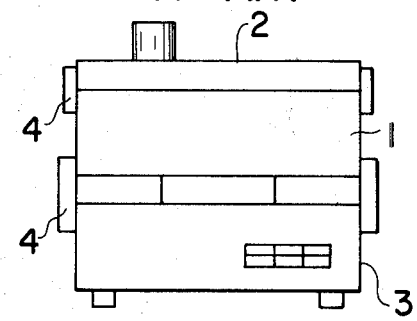

Prior Art, FIGS. 1 and 2

Prior to the description of the preferred embodiments of the present invention, the prior art cooking utensils will be described in brief in order to distinctively point out the defects thereof which the present invention contemplates to overcome.

Next the defects encountered in the conventional cooking utensils will be described in detail with reference to FIGS. 1 and 2, illustrating two conventional juicers respectively.

In the juicer shown in FIG. 1, a cover 2 and a container 1 are placed upon a main body 3 including an electric motor, and one ends of a pair of clamps 4 whose the other ends are fixed to the main body 3 are engaged with the cover 2 so that the container 1 and the cover may be firmly held together with the main body 3. In the juicer shown in FIG. 2, two pairs of clamps 4 are used to firmly hold the cover 2 to the container 1 and to firmly hold the container 1 to the main body 3. The conventional juicers shown in FIGS. 1 and 2 have the common defects to be described in detail hereinafter with particular reference to FIG. 1.

1. It is inconvenient to place the container 1 in correct position upon the main body 3 and to remove it therefrom. To place the container 1 in position upon the main body 3, one holds the container 1 together with the cover 2 by one or both hands, places them on the main body 3 and engages the clamps 4 with the cover 2. To remove the container 1, one releases the clamps 4 by hand, and holds the container 1 together with the cover 2 to remove them from the main body 3.

Thus it is seen that the attachment and removal of the container 1 and the engagement and release of the clamps 4 cannot be made in one step, are inconvenient, and take a relatively long time. The main cause of these defects of the conventional juicer shown in FIG. 1 is due to the clamps 4 which are provided in order to place and firmly hold the container 1 upon the main body 3 in a simple manner. If only one clamp 4 is provided on one side of the juicer, a suitable clamping means must be provided on the other side. In this case the attachment becomes more inconvenient and takes a long time because when the container is placed upon the main body, it must be engaged with the clamping means first. Therefore a pair of clamps 4 are provided on both sides. However one must operate the clamps 4 by hand while he is holding the container 1 by hand. Therefore it becomes impossible to clamp the container 1 and hold it in one step.

In general it is necessary to cook food within a short time, and the fruits are already cut into suitable size to be charged into the juicer when the latter is to be used. It is not preferable that the replacement of the attachment takes a long time, and it is preferable to replace the attachment as soon as possible.

Furthermore when the container 1 is not placed in the correct position, it must be removed from the main body 3 and then placed again. More particularly the container 1 has a coupling means for engagement with the motor in the main body 3 so that the juicer cannot be driven unless the engagement between the coupling means on the side of the container 1 and the motor on the side of the main body is firmly established. If the engagement between them is not satisfactory, the container 1 must be removed and placed again upon the main body 3. Thus it takes a long time before the container 1 is firmly placed upon the main body 3 for operation.

2. The clamps 4 are large in size and extend outwardly as an obstacle.

The clamps 4 also serve as a handle, and the handles cannot be placed inside the main body 3 and the container 1. The clamps 4 which serve to firmly hold the container 1 upon the main body 3 become large in size and extend outwardly from both sides of the juicer.

Since the cooking utensil is used in a kitchen where many other kitchen utensils are stored randomly, the outwardly extending clamps 4 are not preferable. Furthermore, the clamps 4 present a problem when the juicer is stored at the corner of the kitchen. It is inconvenient to hold the clamps by hand in a small kitchen where many other kitchen utensils are used and stored. Moreover there is a fear that the clamps 4 are detached when they hit against other objects. Therefore it is desired that the extension of the clamp may be minimized and the number of clamps used may be also reduced. When the clamps 4 are detached, the container 1 is also detached from the main body 3, thus leading to an unexpected accident.

3. The kitchen utensil of the type described above is provided with various attachments such as juicer, mixer, ice slicer, coffee mill, meat blender and the like which may be mounted upon the main body as needs demand. These attachments should have been designed from the standpoint of their functions, but they must have at least a common part which is adapted to engage with the clamps. This means that the attachments become inevitably similar in shape and dimension.

The coffee mill, meat blender or the like is smaller in dimension than other attachments, but they are designed large in size so that they may be mounted on the main body 3. Therefore they become expensive in cost and cannot be made compact in size.

Figure 3:
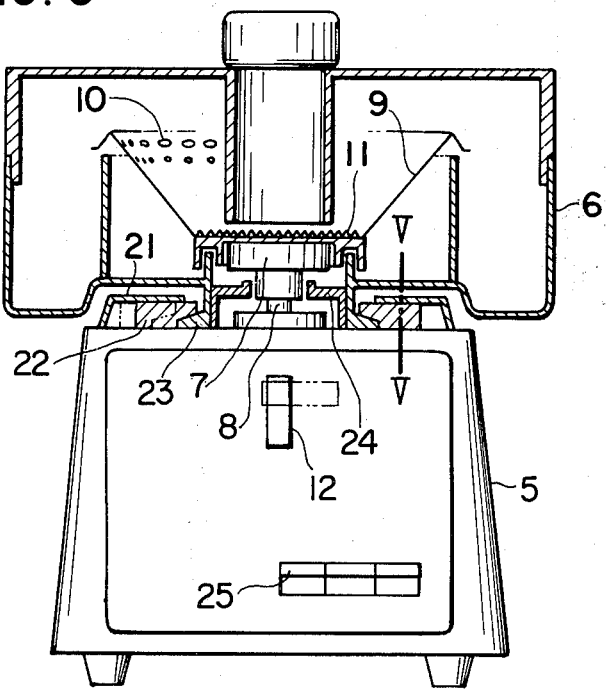
FIG. 3 is a sectional view of a juicer to which is applied the present invention.

Referring to FIGS. 3, a kitchen utensil is shown as comprising a main body 5 which houses an electric motor (not shown) and a juicer container 6 removably attached atop the main body 5.

Reference numeral 7 denotes a turntable to which is screwed a shaft 8 of the motor; and 9, a basket having a large number of small holes formed through the side wall thereof for extracting the juice from the fruits, and a cutter 11 which is formed at the bottom and will be referred to as a "a rotary member" in this specification. The basket 9 may be removably mounted upon the turntable 7. This arrangement is referred to as a coupling means. An external actuating means or lever 12 which is fixed to a connecting rod 13 is disposed at the front side of the main body 5 so that it may be easily operated by a right-handed or left-handed man. The lever 12 may be disposed at any suitable position on the main body 5.

Figure 4:
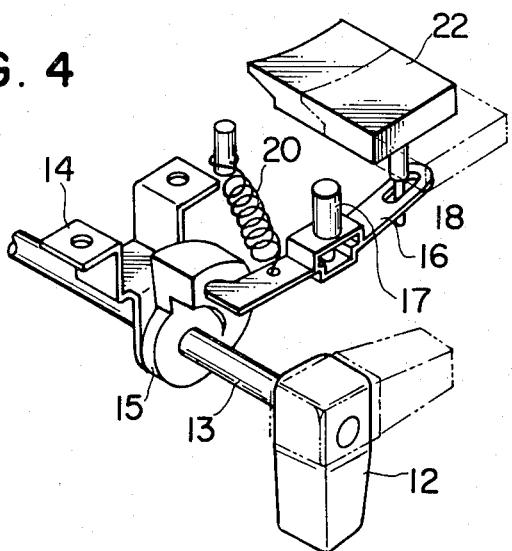
FIG. 4 is a perspective view of a first embodiment of clamping means in accordance with the present invention.

Referring to FIG. 4, the connecting rod 13 is rotatably supported within the main body 5 by a plurality of supporting means or brackets 14, and carries at least one cam 15 which is spaced apart each other by a predetermined distance. An arm 16 is rotatably pivoted to the main body 5 with a pin 17 and has an L-shaped end which slidably contacts with the cam 15. The other end of the arm 16 has an elongated slot into which is fitted a shaft 18 extending from the undersurface of a or sliding member pawl 22. A coiled spring 20 is loaded between the L-shaped end of the arm 16 and the main body 5 so that the arm 16 may be normally in contact with the cam 15.

Referring back to FIG. 3, a cover 21 is fixed to the top of the main body 5. Alternatively the cover 21 may be formed integral with the main body 5. The leading end of the pawl 22 is cut slantly so as to make a close contact with a flange 23 formed at the lower end of the attachment 6, and the upper major surface is curved as best shown in FIG. 4, but it may be flat. The pawl 22 is adapted to slide within the cover 21 in the horizontal direction as will be described in more detail hereinafter so that the means for causing the pawl 22 to slide horizontally may become simple in construction. An annular projection 24 is extended from the top of the main body 5 and is adapted to fit into an annular end of the attachment 6. All of the attachments 6 to be mounted on the main body 5 must have the annular ends and annular flanges 23 which are equal in shape and dimension. The annular projection 24 will be referred to as "positioning means" in this specification. Because of the provision of the cam 15 carried by the shaft 13 (see FIG. 4.), the latter may be disposed in closely spaced apart relation with respect to the shaft 12 of the motor and the clamping means or the pawl 22 may be disposed within the main body 5. Therefore the clamping means in accordance with the present invention may be made simple in construction and the operation may become very simple.

Figure 5:
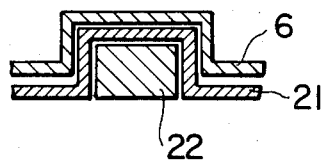
FIG. 5 is a fragmentary sectional view taken along the line V—V of FIG. 3.

The cover 21 of the main body 5 has a cross section as shown in FIG. 5 so that it may also function as a stop for preventing the rotation of the attachment 6.

Reference numeral 25 in FIG. 3 denotes a pushbutton switch.

Next the mode of operation will be described. An attachment 6 is placed over the main body 5 with the annular lower end of the attachment 6 being fitted over the annular projection 24 of the main body 5. Thereafter the lever 12 is rotated from the position indicated by the broken lines to the position indicated by the solid lines in FIG. 3 so that the cam 15 is also rotated. As a result the L-shaped end of the arm 16 slides over the side surface of the cam 15 from the position where the cam 15 has a thin thickness to the position where the cam 15 has a large thickness so that the arm 16 rotates about the pivot 17 in the counterclockwise direction against the coiled spring 20. Therefore the pawl 22 is caused to advance toward the annular flange 23 of the attachment 6 from the cover 24 of the main body 5 because the pin 18 of the pawl 22 in engagement with the elongated slot at the other end of the arm 16 is caused to move in unison with the arm 16. The advanced pawl 22 makes a close contact with the annular flange 23 of the attachment 6 as indicated by the solid lines in FIG. 3 so that the attachment 6 may be firmly secured in position. If required, any other suitable locking means may be used.

To remove the attachment 6, the lever 12 is rotated back to its initial position indicated by the broken lines in FIG. 8 so that the cam 15 rotates in the counterclockwise direction and the lever 16 returns its initial position under the force of the coiled spring 20, causing the pawl 22 to be released radially outwardly from the annular flange 23 of the attachment 6 and to return to the initial position indicated by the broken lines in FIG. 4. Therefore the attachment 6 may be removed from the main body 5.

It is to be understood that the pawl 22 may be so arranged as to advance radially outwardly to engage with the annular flange 23 of the attachment 6, thereby securely holding the latter in position. It is to be understood that the present invention is not limited to the shape and movement of the pawl 22 described hereinbefore and that any shape and movement of the pawl 22 may be employed as far as the pawl 22 may be advanced so as to firmly engage with the annular flange 23 of the attachment 6 by the mechanism described hereinbefore.

From the foregoing description it is seen that according to the present invention the clamps, which were attached to the outside of the main body, may be incorporated within the main body without the latter being increased in dimension, and may be actuated by the lever disposed at the front of the main body in a very simple but reliable manner. Opposed to the prior art cooking utensils provided with a plurality of strong clamps which must be individually operated, the present invention permits the attachment to be securely held in position on the main body or to be removed therefrom only by "one-touch" action of the lever. Therefore the attachment and removal of the attachment may be remarkably facilitated. Furthermore one may be prevented from bitting his finger caught by the clamp, and the accidents caused when the clamps hit or are caught by other things may be prevented. Moreover the appearance may be much enhanced. A variety of attachments such as a juicer, mixer, ice slicer, coffee mill and the like which have the similar engaging portion that is, the similar annular end and annular flange thereof adapted to mate with the annular projection and the pawls of the main body may be attached on the main body as needs demand by "one-touch action."

Thus many functional and economical advantages may be accrued from the present invention.

Figure 6:
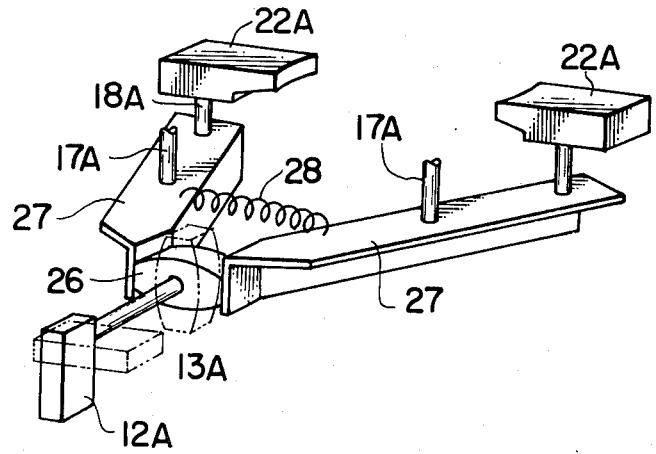
FIG. 6 is a perspective view of a second embodiment of a clamping means in accordance with the present invention.

Next referring to FIG. 6, the second embodiment of the present invention will be described. A connecting rod 13A which is rotatably supported in the main body 5 has a lever 12A fixed at one thereof and a cam 26 fixed at the other end. Arms 27 are rotatably pivoted to the main body 5 with pivot pins 17A and are disposed so as to diverge outwardly from the cam 26. One end of each arm 27 is made into contact with the cam 26 which is oval in shape whereas the other end has a pin 18A supporting a pawl 22A. A spring 28 loaded between the pair of arms 27 serves to cause the other ends of the arms 27 and hence the pawl 22A to move toward each other. The mode of operation is similar to that of the first embodiment and is apparent to those skilled in the art so that no description will be made.

In summary, the clamping mechanism for securely holding an attachment on the main body may be housed within the main body without the latter being increased in dimension, and may be actuated by a lever extending out of the main body so that the attachment and removal may be much facilitated. Furthermore any attachment which has the engaging portion adapted to mate with the engaging portion on the side of the main body may be firmly held in position. Thus the clamping mechanism in accordance with the present invention may permit various types of cooking attachments to use a common main body.

What is claimed is:

1. A culinary kitchen utensil comprising:
a base member for accommodating a driving means, removable culinary appliance attachments drivingly connected to said base member,
at least one clamping means for securing said removable attachments to said base member, said clamping means being movable between a clamping position and a releasing position, and
actuating means for moving said clamping means respectively between said clamping and releasing positions,
said actuating means including a single member for moving all of said clamping means between said clamping and releasing positions in a single operation,
wherein said single member of said actuating means is a lever operatively connected to said clamping means, said lever being exteriorly positioned from said base member, and
wherein said actuating means includes a shaft supported in said base member for rotation, a cam fixed to said shaft in said base member for rotation with said shaft, and a pivotable arm operatively connected between said cam and said clamping means such that said pivotable arm is moved by rotation of said cam thereby moving said clamping means, said shaft being rotated by said lever.

2. A utensil according to claim 1, wherein said clamping means includes a plurality of movable pawls, said plurality of movable pawls being moved in unison between said respective clamping and releasing positions by said actuating means.

3. A utensil according to claim 2, wherein said plurality of movable pawls are arranged within said base portion such that said movable pawls engage an annular flange portion of said removable attachments in the clamping position, thereby securing said removable attachments to said base member in driving connection with said driving means.

4. A culinary kitchen utensil comprising:
a base member for accommodating a driving means,
removable culinary appliance attachments drivingly connected to said base member, said removable attachments including an annular flange in facing relationship to said base member,
clamping means for securing said removable attachments to said base member, said clamping means including at least one sliding member for engaging said annular flange, said sliding member being movable to one of a clamping position and a releasing position, and
actuating means for moving all of said sliding members between said clamping and releasing positions.

5. A utensil according to claim 4, wherein said all of said sliding members are arranged in a top portion of said base member to be horizontally slidable.

6. A utensil according to claim 5, wherein said sliding members are arranged in face-to-face relationship and are slidable in said top portion of said base member to engage said annular flange.

7. A utensil according to claim 5, wherein said clamping means includes a plurality of sliding members.

8. A utensil according to claim 4, wherein said actuating means includes a single member for moving all of said sliding member between respective clamping and releasing positions in a single operation.

9. A utensil according to claim 4, further comprising coupling means disposed in said base member for coupling said driving means to a rotary member of said removable attachments and positioning means disposed in said base member for positioning said removable attachments with respect to said base member.

10. A utensil according to claim 9, wherein said positioning means includes an annular projection extending from said base member toward said removable attachments and said annular flange portion of said removable attachments in facing relationship to said base member, said annular flange portion being adapted to be in engaging relationship with said annular projection.

* * * * *